United States Patent
Ang et al.

(10) Patent No.: US 7,526,566 B2
(45) Date of Patent: Apr. 28, 2009

(54) METHODS OF OPERATING RADIO COMMUNICATIONS DEVICES INCLUDING PREDEFINED STREAMING TIMES AND ADDRESSES AND RELATED DEVICES

(75) Inventors: John Ang, Chapel Hill, NC (US); Stephen K. Forbes, Raleigh, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 935 days.

(21) Appl. No.: 10/939,207

(22) Filed: Sep. 10, 2004

(65) Prior Publication Data

US 2006/0058026 A1    Mar. 16, 2006

(51) Int. Cl.
| G06F 15/16 | (2006.01) |
| G06F 3/14 | (2006.01) |
| H04N 5/445 | (2006.01) |
| H04N 7/173 | (2006.01) |
| G06F 3/00 | (2006.01) |
| G06F 3/048 | (2006.01) |
| G06F 13/00 | (2006.01) |

(52) U.S. Cl. ............... 709/231; 709/219; 709/227; 709/232; 715/738; 715/864; 715/963; 725/39; 379/908

(58) Field of Classification Search ............... 709/203, 709/219, 227, 231, 232; 715/738, 739, 745, 715/810, 864, 963, 978; 725/39, 106; 379/900, 379/908
See application file for complete search history.

(56) References Cited

U.S. PATENT DOCUMENTS

| 6,606,748 B1 * | 8/2003 | Tomioka et al. ............... 725/50 |
| 6,678,215 B1 * | 1/2004 | Treyz et al. ............... 368/10 |
| 6,725,275 B2 * | 4/2004 | Eyal ............... 709/231 |
| 6,756,997 B1 * | 6/2004 | Ward et al. ............... 715/716 |
| 6,760,916 B2 * | 7/2004 | Holtz et al. ............... 725/34 |
| 6,785,704 B1 * | 8/2004 | McCanne ............... 718/105 |
| 6,857,130 B2 * | 2/2005 | Srikantan et al. ............... 725/93 |
| 6,934,756 B2 * | 8/2005 | Maes ............... 709/227 |
| 6,938,101 B2 * | 8/2005 | Hayes et al. ............... 710/5 |
| 6,959,327 B1 * | 10/2005 | Vogl et al. ............... 709/219 |

(Continued)

FOREIGN PATENT DOCUMENTS

WO    WO02/065732    8/2002

(Continued)

OTHER PUBLICATIONS

Schulzrinne, H. et al. "Real Time Streaming Protocol (RTSP)," RFC 2326, Apr. 1998, pp. 1-92.*

(Continued)

*Primary Examiner*—Larry D Donaghue
*Assistant Examiner*—Melvin H Pollack
(74) *Attorney, Agent, or Firm*—Myers Bigel Sibley & Sajovec, P.A.

(57) ABSTRACT

Methods of operating radio communications devices may include accepting user input at the radio communications device of a streaming time to initiate media streaming, and accepting user input at the radio communications device of a network address of a streaming server to provide media streaming content. At the streaming time, initiating media streaming from the streaming server identified by the network address may be initiated over a radio link. Related devices are also discussed.

19 Claims, 5 Drawing Sheets

U.S. PATENT DOCUMENTS

| | | | |
|---|---|---|---|
| 6,970,909 B2* | 11/2005 | Schulzrinne | 709/206 |
| 6,973,665 B2* | 12/2005 | Dudkiewicz et al. | 725/46 |
| 6,975,835 B1* | 12/2005 | Lake et al. | 455/3.01 |
| 7,017,159 B1* | 3/2006 | Baker | 719/310 |
| 7,058,376 B2* | 6/2006 | Logan et al. | 455/186.1 |
| 7,130,616 B2* | 10/2006 | Janik | 455/412.1 |
| 7,139,813 B1* | 11/2006 | Wallenius | 709/219 |
| 7,150,017 B1* | 12/2006 | Vogl et al. | 718/102 |
| 7,161,483 B2* | 1/2007 | Chung | 340/531 |
| 7,171,491 B1* | 1/2007 | O'Toole et al. | 709/244 |
| 7,181,701 B2* | 2/2007 | Howard et al. | 715/854 |
| 7,184,848 B2* | 2/2007 | Krzyzanowski et al. | 700/90 |
| 7,185,094 B2* | 2/2007 | Marquette et al. | 709/225 |
| 7,191,242 B1* | 3/2007 | Serenyi et al. | 709/231 |
| 7,191,244 B2* | 3/2007 | Jennings et al. | 709/231 |
| 7,203,758 B2* | 4/2007 | Cook et al. | 709/231 |
| 7,237,017 B1* | 6/2007 | Pecus et al. | 709/223 |
| 7,243,130 B2* | 7/2007 | Horvitz et al. | 709/207 |
| 7,263,547 B2* | 8/2007 | Kloba et al. | 709/217 |
| 7,274,684 B2* | 9/2007 | Young et al. | 370/352 |
| 7,281,034 B1* | 10/2007 | Eyal | 709/219 |
| 7,296,082 B2* | 11/2007 | Leighton et al. | 709/231 |
| 7,333,396 B1* | 2/2008 | Treyz et al. | 368/10 |
| 7,340,526 B2* | 3/2008 | Kime et al. | 709/231 |
| 7,373,650 B1* | 5/2008 | Rodriguez et al. | 725/41 |
| 7,376,710 B1* | 5/2008 | Cromwell et al. | 709/219 |
| 7,433,714 B2* | 10/2008 | Howard et al. | 455/567 |
| 7,463,356 B2* | 12/2008 | Grossinger et al. | 356/402 |
| 7,468,934 B1* | 12/2008 | Janik | 368/13 |
| 2002/0002039 A1* | 1/2002 | Qureshey et al. | 455/344 |
| 2002/0072326 A1* | 6/2002 | Qureshey et al. | 455/3.02 |
| 2002/0078818 A1* | 6/2002 | Elliott | 84/609 |
| 2002/0112237 A1* | 8/2002 | Kelts | 725/39 |
| 2002/0156660 A1* | 10/2002 | Nishimura et al. | 705/5 |
| 2003/0013483 A1* | 1/2003 | Ausems et al. | 455/556 |
| 2003/0194968 A1* | 10/2003 | Young | 455/45 |
| 2003/0236906 A1* | 12/2003 | Klemets et al. | 709/231 |
| 2004/0003102 A1* | 1/2004 | DuVall et al. | 709/231 |
| 2004/0025186 A1* | 2/2004 | Jennings et al. | 725/93 |
| 2004/0032421 A1* | 2/2004 | Williamson et al. | 345/704 |
| 2004/0058710 A1* | 3/2004 | Timmins et al. | 455/560 |
| 2004/0107271 A1* | 6/2004 | Ahn et al. | 709/219 |
| 2004/0128514 A1* | 7/2004 | Rhoads | 713/176 |
| 2004/0181706 A1* | 9/2004 | Chen et al. | 713/600 |
| 2004/0264301 A1* | 12/2004 | Howard et al. | 368/28 |
| 2005/0021826 A1* | 1/2005 | Kumar | 709/232 |
| 2005/0033850 A1* | 2/2005 | Kirkland | 709/228 |
| 2005/0058026 A1* | 3/2005 | Hocherman | 368/73 |
| 2005/0174889 A1* | 8/2005 | Marcantonio et al. | 368/12 |
| 2006/0010472 A1* | 1/2006 | Godeny | 725/62 |

FOREIGN PATENT DOCUMENTS

WO     WO 02065732 A1 *   8/2002

OTHER PUBLICATIONS

Schulzrinne, H. et al. "RTP: A Transport Protocol for Real-Time Applications," RFC 3550, Jul. 2003, pp. 1-104.*

Schulzrinne, H. and Casner, S. "RTP Profile for Audio and Video Conferences with Minimal Control," RFC 3551, Jul. 2003, pp. 1-44.*

Van Der Meer, J. et al. "RTP Payload Format for Transport of MPEG-4 Elementary Streams," RFC 3640, Nov. 2003, pp. 1-43.*

Coene, L. "Stream Control Transmission Protocol Applicability Statement," RFC 3257, Apr. 2002, pp. 1-13.*

Kikuchi, Y. et al. "RTP Payload Format for MPEG-4 Audio/Visual Streams," RFC 3016, Nov. 2000, pp. 1-21.*

Finlayson, R. "A More Loss-Tolerant RTP Payload Format for MP3 Audio," RFC 3119, Jun. 2001, pp. 1-19.*

Barbir, A. et al. "An Architecture for Open Pluggable Edge Services (OPES)," RFC 3835, Aug. 2004, pp. 1-17.*

Bilan, A.P.P.S. "Streaming Audio over Bluetooth ACL Links," Proceedings International Conference on Information Technology: Coding and Computing [Computers and Communications], Apr. 30, 2003, pp. 287-291.*

Elsen, I. et al. "Streaming Technology in 3G Mobile Communication Systems," Computer, vol. 34, Issue 9, Sep. 2001, pp. 46-52.*

Kohno, Michimune and Rekimoto, Jun. "New Generation of IP-Phone Enabled Mobile Devices," Lecture Notes in Computer Science: Human Computer Interaction with Mobile Devices, vol. 2411, Jan. 1, 2002, pp. 319-323.*

Part 2: "Streaming: Why it's so Cool", http://www.doit.wisc.edu/streaming/tutorial/transcripts/transcript2.htm, Jul. 14, 2004.

"What is Streaming Media? (2)"; Streaming Media World; http://smw.internet.com/gen/tutor/whatis/index2.html, Jul. 14, 2004.

"What is Streaming Media? (3)"; Streaming Media World; http://smw.internet.com/gen/tutor/whatis/index2.html, Jul. 14, 2004.

"What is Streaming Media? (4)"; Streaming Media World; http://smw.internet.com/gen/tutor/whatis/index2.html, Jul. 14, 2004.

"Real-Time Transport Protocol"; QuickTime-Tutorials-RTSP; http://www.apple.com/quicktime/tools_tips/tutorials/rtp.html, Jul. 15, 2004.

"RTP: Real-Time Transport Protocol"; RTP: Real-Time Transport Protocol Overview (RFC 3550 3551); http://www.javvin.com/protocolRTP.html, Jul. 15, 2004.

"RTSP: Real Time Streaming Protocol"; RTSP: Real Time Streaming Protocol Overview (RFC 2326); http://www.javvin.com/protocolRTSP.html, Jul. 15, 2004.

"RTSP Frequently Asked Questions"; rtsp.org: RTSP Frequently Asked Questions; http://www.rtsp.org/2001/faq.html, Jul. 15, 2004.

"Introduction to Wireless Access Protocol"; W.J. Gilmore 2000-02-18; Dev Articles; http://www.devarticles.com/index2.php?option=content&task=view&id=772&pop=1&pag, Jul. 15, 2004.

PCT Search Report and Written Opinion of the International Searching Authority for PCT/US2005/030251.

* cited by examiner

Icon

- Meeting
- Date
- Travel
- Vacation
- Anniversary
- Miscellaneous
- MEDIA

Select

Figure 3E

Start Date/Time

Date:
04/26/04

Time:
06:00AM

Select

Figure 3F

Network Address

URL:
rtsp://255.255.255.255

Select

Figure 3G

METHODS OF OPERATING RADIO COMMUNICATIONS DEVICES INCLUDING PREDEFINED STREAMING TIMES AND ADDRESSES AND RELATED DEVICES

FIELD OF THE INVENTION

The present invention relates to the field of communications and more particularly to radio communications methods and devices.

BACKGROUND OF THE INVENTION

As the processing capabilities of hand held radio communications devices such as radiotelephones and/or personal digital assistants (PDAs) increase, more advanced applications for these devices are being made available. A Wireless Application Protocol (WAP) enabled radiotelephone and/or PDA, for example, may include an Internet browser providing mobile Internet access. Moreover, content available for wireless internet access is rapidly increasing with increasing wireless communications system bandwidths and with increasing numbers of internet enabled radiotelephones and PDAs being used. Accordingly, there continues to exist a need for improved data processing functionality in radio communications devices.

SUMMARY

According to embodiments of the present invention, methods of operating a radio communications device may include accepting user input at the radio communications device of a streaming time to initiate media streaming, and accepting user input at the radio communications device of a network address of a streaming server to provide media streaming content. At the streaming time, media streaming may be initiated from the streaming server identified by the network address over a radio link. The network address, for example, may be a Uniform Resource Locator (URL) address, and the radio communications device may be further configured to establish a radiotelephone communication with another communications device. The streaming time may include both a date and a time of day. In an alternative, the streaming time may include a time of day but not a date, with media streaming being initiated each day at the streaming time of day until the communications device is reprogrammed.

For example, user input at the radio communications device may be used to select a calendar function from a plurality of personal organizer functions before accepting user input of the streaming time and before accepting user input of the network address. User input of a streaming date to initiate media streaming may be accepted after accepting user input selecting the calendar function. Moreover, accepting user input of the streaming time may include accepting user input of the streaming time after accepting user input selecting the calendar function, and initiating media streaming may include initiating media streaming on the streaming date at the streaming time.

In an alternative, a menu of a plurality of personal organizer functions including a calendar function may be provided before accepting user input of the streaming time and before accepting user input of the network address. After providing the menu of the plurality of organizer functions, user input may be accepted at the radio communications device selecting the calendar function from the plurality of personal organizer functions. Responsive to accepting user input selecting the calendar function, a menu of a plurality of calendar functions including an appointment function may be provided, and after providing the menu of the plurality of calendar functions, user input may be accepted at the radio communications device selecting the appointment function. After accepting user input selecting the appointment function, user input of a streaming date to initiate media streaming may be accepted at the radio communications device. Moreover, user input of the streaming time may be accepted after accepting user input selecting the calendar function, and media streaming may be initiated on the streaming date at the streaming time.

In another alternative, user input selecting an alarm function from a plurality of personal organizer functions may be accepted at the radio communications device before accepting user input of the streaming time and before accepting user input of the network address. Moreover, user input of the streaming time may be accepted after accepting user input selecting the alarm function, and media streaming may be initiated at the streaming time. Initiating media streaming may include providing an alarm at the streaming time, accepting user input at the radio communications device to allow initiating media streaming, and responsive to accepting user input to allow initiating media streaming, transmitting a streaming request to the streaming server identified by the network address wherein the streaming request is transmitted over a radio link. In an alternative, initiating media streaming may include transmitting a streaming request to the streaming server identified by the network address at the streaming time without user intervention.

Moreover, the radio communications device may be turned off between accepting user input of the network address of the streaming server and the streaming time, and initiating media streaming may include turning the radio communications device on without user intervention. In addition, initiating media streaming may include transmitting a streaming request to the streaming server identified by the network address, and after transmitting the streaming request, receiving the media streaming content from the streaming server identified by the streaming request. More particularly, the streaming request may be transmitted according to a Real-Time Streaming Protocol (RTSP), and the media streaming content may be received according to a Real-time Transport Protocol (RTP). Receiving the media streaming content may also include processing the media streaming content and providing the processed media streaming content as output from a user interface at the radio communications device. The media streaming content may be processed, for example, using a media player.

According to additional embodiments of the present invention, a radio communications device may include a transceiver configured to transmit and receive radio communications, a user interface configured to accept user input and provide user output, and a controller coupled to the transceiver and the user interface. The controller may be configured to accept a streaming time to initiate media streaming wherein the streaming time is accepted as user input through the user interface. The controller may accept user input of a network address of a streaming server to provide media streaming content wherein the network address is accepted as user input through the user interface. In addition, the controller may initiate media streaming from the streaming server identified by the network address at the streaming time over a radio link through the transceiver. More particularly, the network address may be a Uniform Resource Locator (URL) address. In addition, the controller may be further configured to establish a radiotelephone communication with another communications device through the transceiver.

In addition, the controller may be further configured to accept selection of a calendar function from a plurality of personal organizer functions before accepting the streaming time and before accepting the network address with selection of the calendar function being accepted as user input through the user interface. The controller may also be configured to accept a streaming date to initiate media streaming after selection of the calendar function, and the streaming date may be accepted as user input through the user interface. The controller may be further configured to accept the streaming time after accepting selection of the calendar function and to initiate media streaming on the streaming date at the streaming time.

In an alternative, the controller may be configured to provide a menu of a plurality of personal organizer functions including a calendar function before accepting the streaming time and before accepting the network address. Selection of the calendar function from the plurality of personal organizer functions may be accepted after providing the menu of the plurality of organizer functions, and a menu of a plurality of calendar functions including an appointment function may be provided responsive to accepting user input selecting the calendar function. Selection of the appointment function may be accepted after providing the menu of the plurality of calendar functions, and a streaming date to initiate media streaming may be accepted after accepting selection of the appointment function. Moreover, the streaming time may be accepted after selection of the calendar function, and media streaming may be initiated on the streaming date at the streaming time.

In another alternative, the controller may be configured to accept selection of an alarm function from a plurality of personal organizer functions before accepting the streaming time and before accepting the network address, and then to accept the streaming time after selection of the alarm function. In addition, the controller may be configured to provide notification of scheduled media streaming through the user interface, to accept allowance to initiate media streaming though the user interface, and to transmit a streaming request through the transceiver to the streaming server identified by the network address responsive to accepting allowance to initiate media streaming. In an alternative, the controller may be configured to transmit a streaming request to the streaming server identified by the network address at the streaming time without user intervention. Moreover, the radio communications device may be turned off between accepting the network address of the streaming server and the streaming time, and the controller may turn the radio communications device on at the streaming time without user intervention.

The controller may be further configured to transmit a streaming request through the transceiver to the streaming server identified by the network address, and to receive media streaming content from the streaming server identified by the streaming request after transmitting the streaming request. For example, the controller may be configured to transmit the streaming request through the transceiver according to a Real-Time Streaming Protocol (RTSP), and to receive the media streaming content through the transceiver according to a Real-tine Transport Protocol (RTP). In addition, the controller may be configured to process the media streaming content and to provide the processed media streaming content as output through the user interface. More particularly, the controller may be configured to process the media stream using a media player.

BRIEF DESCRIPTION OF THE DRAWINGS

FIGS. 3A-G are screens of calendar functions according to certain embodiments of the present invention.

DETAILED DESCRIPTION

The present invention will now be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by those of skill in the art, the present invention may be embodied as methods or devices. Accordingly, the present invention may take the form of a hardware embodiment, a software embodiment or an embodiment combining software and hardware aspects. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items.

It will also be understood that although the terms first, second, etc. are used herein to describe various elements, these elements should not be limited by these terms. These terms are only used to distinguish one element or embodiment from another element or embodiment. Thus, a first element or embodiment could be termed a second element or embodiment, and similarly, a second element or embodiment may be termed a first element or embodiment without departing from the teachings of the present invention.

Figure 1:
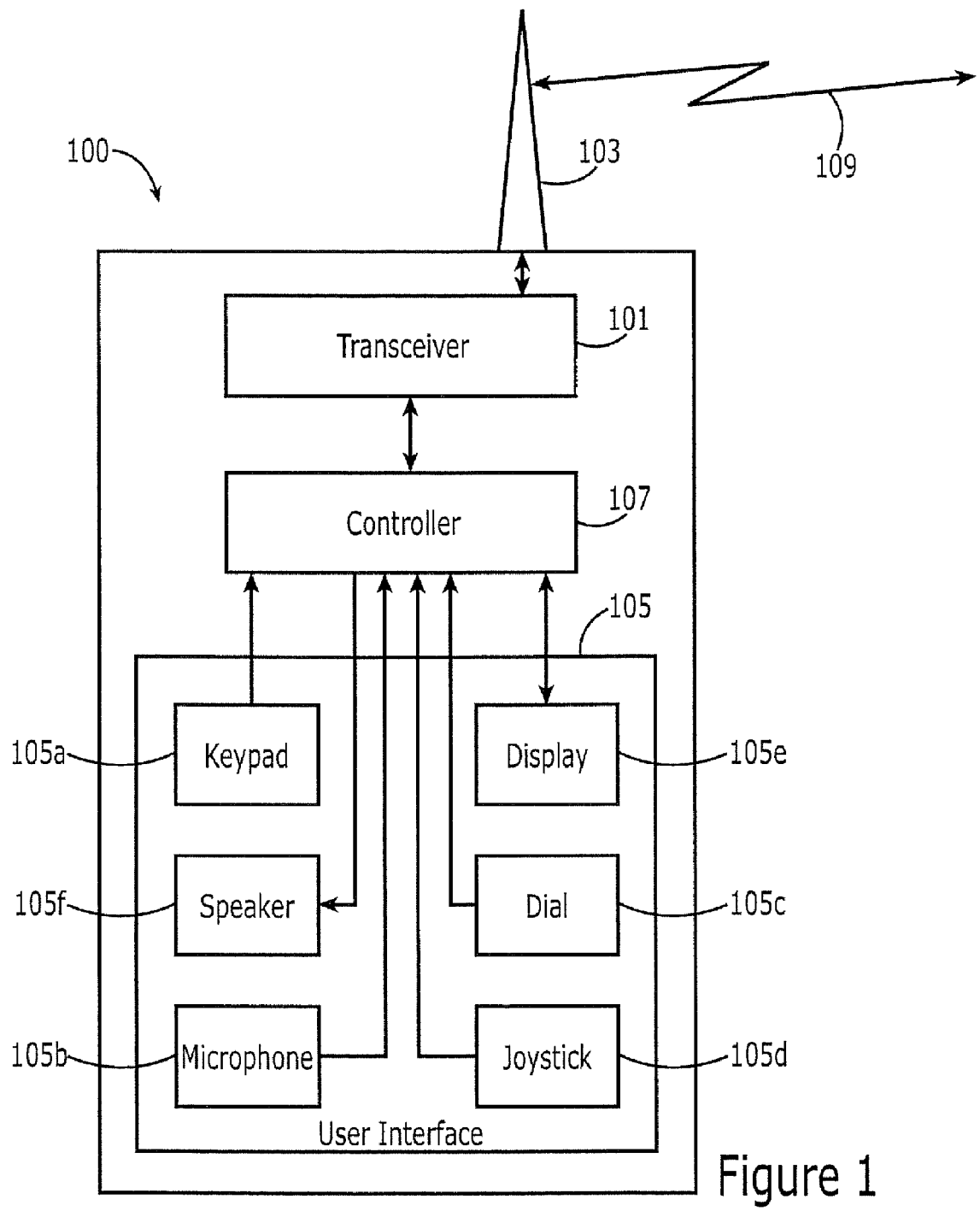
FIG. 1 is a block diagram of radio communications devices according to certain embodiments of the present invention.

As shown in FIG. 1, radio communications device 100 according to embodiments of the present invention may include a transceiver 101 configured to transmit and receive radio communications through antenna 103 over a radio link 109, a user interface 105 configured to accept user input and provide user output, and a controller 107 coupled to the transceiver 101 and the user interface 105. By way of example, the user interface 105 may include one or more inputs devices such as a keypad 105a, a microphone 105b, a dial 105c, and/or a joystick 105d to accept information from a user of the radio communications device 100, and one or more output devices such as a display 105e and/or a speaker 105f to provide information to a user of the radio communications device 100. Moreover, the display 105e may be a touch sensitive display providing both input from the user and image and/or video output to the user.

The radio communications device 100, for example, may provide functionality of a radiotelephone and/or a personal digital assistant. More particularly, the radio communications device 100 may provide functionality such as an electronic calendar, an alarm, an electronic address book, an electronic calendar, an audio recorder/player, radiotelephone communications, an internet browser, an e-mail transmitter/receiver/reader, text messaging, paging, a note/memo pad, a timer, a stopwatch, a calculator, a draw program, and/or other functionalities. More particularly, an internet browser of the radio communications device may operate according to a protocol such as the Wireless Application Protocol (WAP) to support internet access over the radio link 109. In addition or in an alternative, radiotelephone communications may be provided according to a cellular radiotelephone communications standard such as the Global System for Mobile Communications (GSM) standard, the Code Division Multiple Access (CDMA) standard, and/or the Personal Communications Service (PCS) standard.

When providing functionality of a radiotelephone, the controller 107 may initiate a radiotelephone call responsive to a telephone number entered or selected using one or more of keypad 105a, touch sensitive display 105e, dial 105c, and/or joystick 105d. The controller 107 may accept or decline a radiotelephone call initiated by another telephone responsive to user input provided using one or more of keypad 105a, touch sensitive display 105e, dial 105c, and/or joystick 105d. Once a radiotelephone call is established, voice data from the remote telephone can be received through the radio link 109, antenna 103, and transceiver 101, the voice data can be processed by the controller 107, and the processed voice data can be output through speaker 105f. Speech from the user of the radio communications device 100 may be accepted at the microphone 105b, processed by the controller 107 and transmitted over the radio link 109 using transceiver 101 and antenna 103.

When providing functionality of an Internet browser, the controller 107 may act as a client linked to a server over the radio link 109 and a network such as the Internet. The controller 107 may request information from the server responsive to user input provided, for example, through keypad 105a, joy stick 105d, dial 105c, and/or touch sensitive display 105e. In turn, the server may respond with the requested information that is received through the radio link 109, antenna 103, and transceiver 101, that is processed by the controller 107, and that is provided on display 105e. Moreover, the controller 107 may initiate media streaming from a streaming server, and media streaming content may be provided through the radio link 109, the antenna 103, and the transceiver 101, with the controller 107 processing the media streaming content and providing the processed content for output on the display 105e and/or the speaker 105f. Audio content may be output through speaker 105f, and video content may be output through display 105e. Moreover, audio and video content from a streaming server may be respectively output from the speaker 105f and display 105e at the same time.

Figure 2:
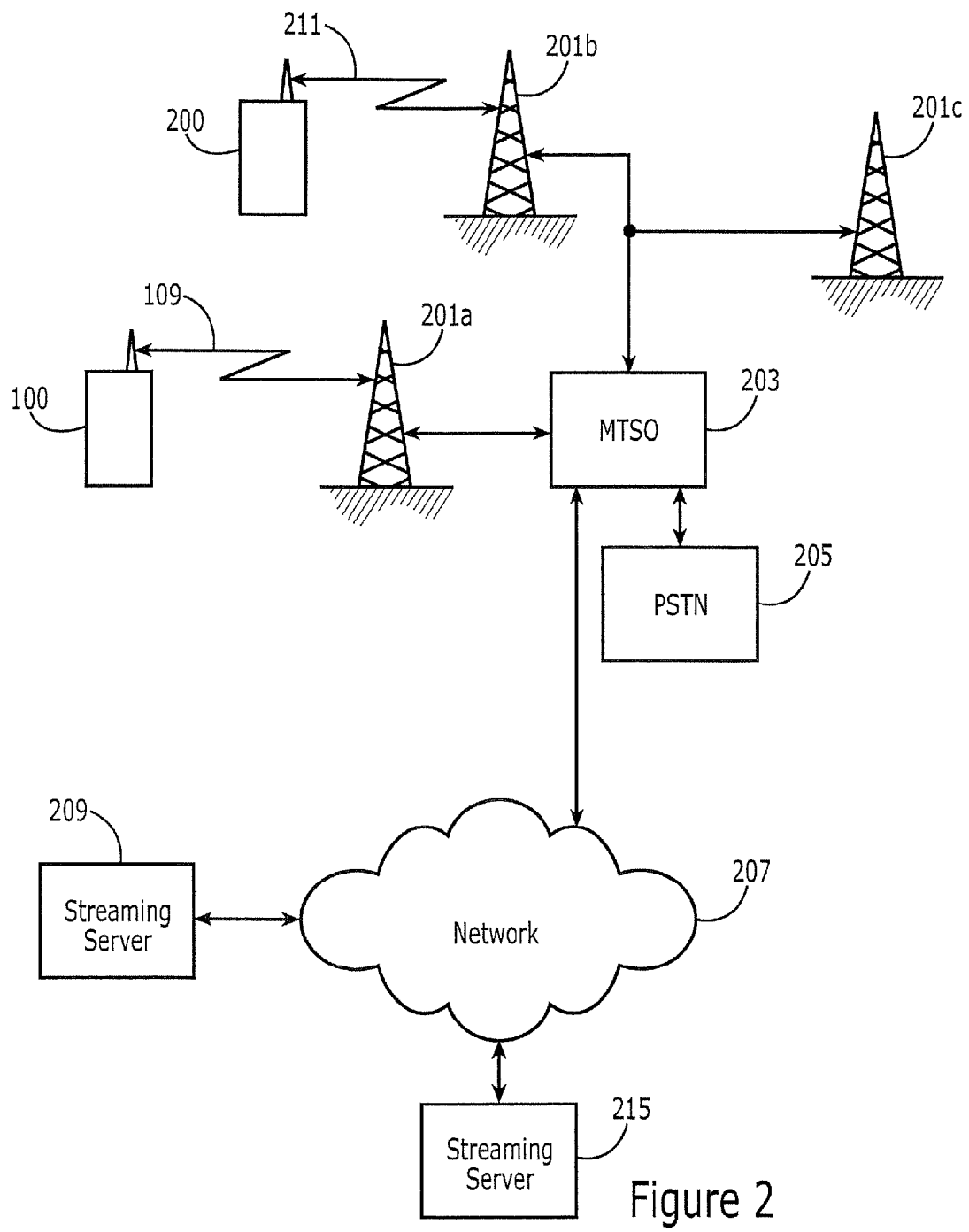
FIG. 2 is a diagram of communications networks according to certain embodiments of the present invention.

As shown in FIG. 2, communications with the radio communications device 100 may be provided using a wireless communications network including a plurality of base stations 201a-c and a mobile telephone switching office (MTSO) 203. Moreover, the wireless communications network may be coupled to a public switched telephone network 205 and/or a network 207 such as the Internet. While a direct coupling is shown between the MTSO 203 and the network 207, additional and/or different couplings may be provided. For example, the coupling between the MTSO 203 and the network 207 may be provided through the PSTN 205.

For example, the device 100 may provide radiotelephone functionality, and the wireless communications network may be a cellular radiotelephone network according to a cellular radiotelephone standard such as GSM, CDMA, and/or PCS. Accordingly, the wireless communications network may support radiotelephone and/or other communications between the device 100 and another radiotelephone 200. In the example of FIG. 2, a radiotelephone communication between device 100 and radiotelephone 200 may be provided using radio link 109, base station 201a, MTSO 203, base station 201b, and radio link 211. If both devices are within range of the same base station, communications therebetween may be provided without the MTSO and/or without a second base station. In addition, radiotelephone communications may be provided between the device 100 and a conventional landline telephone coupled to the PSTN 205.

By providing that the radio communications device 100 is WAP enabled, the radio communications device may be configured to access the network 207 and other devices coupled thereto. For example, the radio communications device 100 may be configured to transmit a request for information addressed to web server 215 using a URL address for the web server 215, and the web server may respond by transmitting the requested information to the device 100. The link between the device 100 and web server 215 may be provided through radio link 109, base station 201a, MTSO 203, and network 207. The radio communications device 100 may be similarly configured to transmit a streaming request addressed to the streaming server 209 using a URL address for the streaming server 209, and the streaming server 209 may respond by providing media streaming content (such as audio, video, and/or animation) to the device 100. The link between the device 100 and the streaming server 209 may be provided, for example, through radio link 109, base station 201a, MTSO 203, and network 207. While only two servers are illustrated by way of example in FIG. 2, it will be understood that many server and/or client devices may be coupled directly and/or indirectly to the network 207.

According to embodiments of the present invention, the controller 107 may be configured to initiate streaming with a predetermined streaming server at a predetermined time based on information previously entered by a user of the radio communications device 100. More particularly, a user of the device 100 may enter a streaming time and a network address of a streaming server (such as streaming server 209) using one or more of keypad 105a, touch sensitive display 105e, dial 105c, and/or joystick 105d, and the controller 107 may accept the streaming time and the network address from the user interface 105. The streaming time may define a particular time to initiate media streaming from the streaming server defined by the network address. The network address may, for example, be an actual Uniform Resource Locator (URL) address for the streaming server, or the network address may be an alias of a URL address or provide a link to a URL address. At the streaming time, the controller 107 may initiate media streaming from the streaming server (such as streaming server 209) identified by the network address through the radio link 109, the antenna 103, and the transceiver 101.

Once the streaming time and the network address have been accepted by the controller 107, the controller 107 may be configured to initiate media streaming by transmitting a streaming request through the transceiver 101, the antenna 103, the radio link 109, the base station 201a, MTSO 203, and network 207 to the streaming server 209 identified by the network address at the streaming time without user intervention at the streaming time. Stated in other words, the controller 107 may be configured to automatically initiate media streaming at a predetermined streaming time without user intervention at that predetermined streaming time. If the device 100 is turned off at the streaming time, the controller 107 may be further configured to automatically turn the device 100 on at the streaming time and to initiate media streaming without user intervention.

In an alternative, the controller 107 may be configured to provide notification of scheduled media streaming through the user interface 105 before transmitting a streaming request. More particularly, the notification may be provided, for example, as a visual notification using display 105e and/or an audible notification using speaker 105f. The user may then choose to allow or decline media streaming at the streaming time using keypad 105a, touch sensitive display 105e, dial 105c, and/or joystick 105d. The controller 107 can then transmit the streaming request through the transceiver 101 to the streaming server 209 identified by the network address responsive to accepting user allowance to initiate media streaming. If the user does not input an allowance of media streaming or if user input declines media streaming, the controller 107 may withhold the streaming request so that media streaming content is not requested and/or received from the streaming server 209. Upon notification of the scheduled media streaming, the user may either allow or decline streaming, and the controller may be configured to withhold transmission of a streaming request until the user provides allowance.

As discussed above, the controller 107 may transmit a streaming request through the transceiver 101 to the streaming server 209 identified by the network address when initiating media streaming. On receipt of the streaming request, the streaming server 209 may provide media streaming content that is received at the controller 107 through the transceiver 101. Moreover, the streaming request may be transmitted by the controller 107 through the transceiver 101 according to a Real-Time Streaming Protocol (RTSP), and the media streaming content may be transmitted by the streaming server 209 and received at controller 107 through transceiver 101 using a Real-time Transport Protocol (RTP).

Moreover, the controller 107 may be configured to process the media streaming content and to provide the processed media streaming content as output though the user interface 105. For example, an audio component of the processed media streaming content may be output through speaker 105f, and a video, animation, or image portion of the processed media streaming content may be output through display 105e. More particularly, the controller 107 may process the received media streaming content using a media player such as Windows Media Payer by Microsoft or RealPlayer by RealNetworks.

According to particular embodiments of the present invention, the streaming time and network address of the streaming server may be programmed in the controller 107 using a calendar function provided by the radio communications device. For example, the radio communications device may be a Personal Digital Assistant (PDA) providing personal organizer functions including a calendar function such as may be provided by Palm OS, Pocket PC, and/or other PDA operating systems. In an alternative, the radio communications device may be a radiotelephone providing personal organizer functions including a calendar function. Moreover, a PDA according to some embodiments of the present invention may provide radiotelephone functionality, and/or a radiotelephone according to some embodiments of the present invention may provide PDA functionality.

Examples of screens used to implement a calendar function according to embodiments of the present invention are illustrated in FIGS. 3A-G. The screens of FIGS. 3A-G may be generated by the controller 107 and provided on display 105e. While particular text formats are illustrated in FIGS. 3A-G, different formats may be provided. In alternatives, information of FIG. 3A-G may be provided in a graphic format as opposed to text, or the information may be provided in a combined text and graphic format. For example, information of FIGS. 3A-G may be provided using icons, drop down menus, and/or text.

The radio communications device 100 may provide a plurality of functionalities as discussed above. For example, an opening screen may be provided on display 105e when the device 100 is turned on, and the opening screen may provide access to a plurality of different functionalities such as radiotelephone functionality, personal organizer, functionality, and/or gaming functionality. For example, access to these functionalities may be provided by touching a respective icon on touch sensitive display 105e. In an alternative, an arrow key of keypad 105a, joystick 105d, and/or dial 105c may allow scrolling through and selection of device functionalities.

Figure 3A:
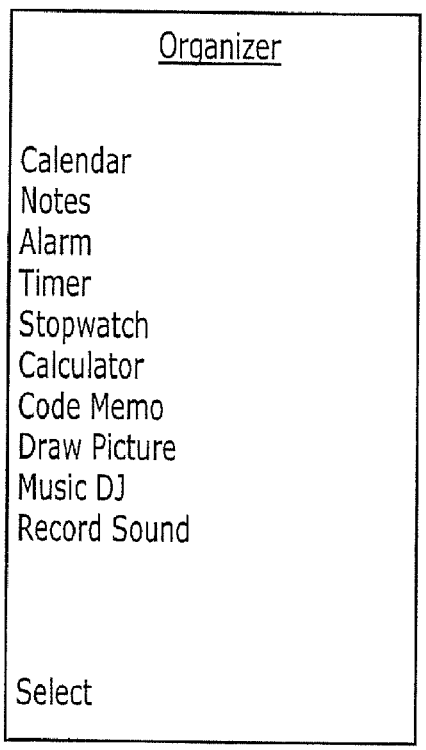

On selecting the organizer functionality, the screen of FIG. 3A may be provided on display 105e, and the screen of FIG. 3A may include a menu of personal organizer functions such as a "Calendar" function, a "Notes" function, an "Alarm" function, a "Timer" function, a "Stopwatch" function, a "Code memo" function, a "Draw Picture" function, a "Music DJ" function, and/or a "Record Sound" function. An "Address Book" function may also be included in the menu of personal organizer functions. In an alternative, an "Address Book" function may be provided separate from the personal organizer functions. With a touch sensitive display, the desired menu item may be selected by touching the respective menu item, and then touching the select option. In an alternative, merely touching the menu item may result in selection without requiring touching a separate select option. In addition or in an alternative, selection may be performed using the keypad 105a, dial 105c, and/or joystick 105d. Moreover, the menu may be provided using text, graphic icons, a pull down menu, and/or combinations thereof. Any of the personal organizer menu items may be selected to proceed with the respective function, and subsequent screens may provide selection of the respective menu items. Moreover, fewer or more menu items may be provided on the screen of FIG. 3A that appear on the display and/or accessible via, for example, drop down menus.

Figure 3B:
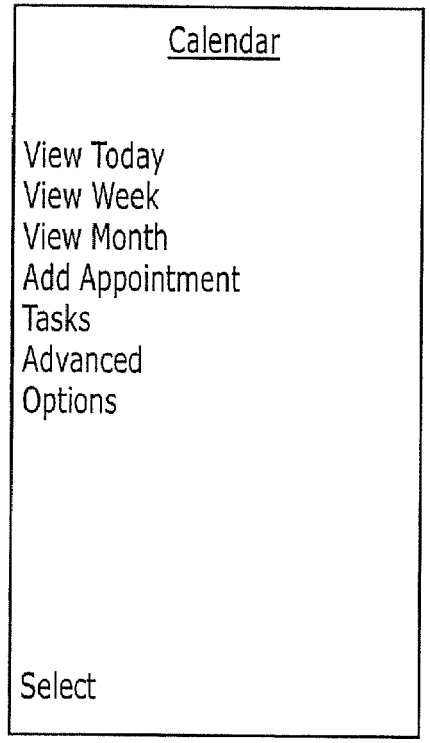

On selecting the "Calendar" function, the screen of FIG. 3B may be provided on display 105e. As shown, the screen of FIG. 3B may include a menu of calendar functions such as a "View Today" function, a "View Week" function, a "View Month" function, an "Add Appointment" function, a "Tasks" function, and/or an "Advanced Options" function. With a touch sensitive display, the desired menu item may be selected by touching the respective menu item, and then touching the select option. In an alternative, merely touching the menu item may result in selection without requiring touching a separate select option. In addition or in an alternative, selection may be performed using the keypad 105a, dial 105c, and/or joystick 105d. Moreover, the menu may be provided using text, graphic icons, a pull down menu, and/or combinations thereof. Any of the calendar menu items may be selected to proceed with the respective function, and subsequent screens may provide selection of the respective menu items. For example, the "View Today" item may be selected to view appointments and/or tasks for today, the "View Week" item may be selected to view appointments and/or tasks for the week, and the "View Month" item may be selected to view appointments and/or tasks for the month. The "Add Appointment" task may be selected to add an appointment to the calendar, and the "Tasks" item may be selected to add a task to the calendar. Moreover, fewer or more menu items may be provided on the screen of FIG. 3B.

Figure 3C:
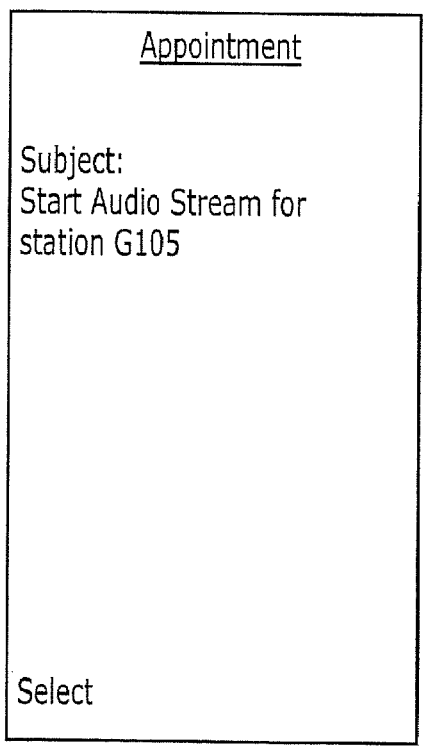

On selecting the "Add Appointment" function, the Appointment screen of FIG. 3C may be provided on the display 105e, and the Appointment screen may include the prompt "Subject:" allowing entry of text describing the subject of the Appointment. The user may then enter text such as "Start Audio Stream For Station G105" using keypad 105a, touch sensitive display 105e, dial 105c, and/or joystick 105d, and the final text can be accepted using the select option. On accepting the subject text, the Appointment screen of FIG. 3D may be provided on display 105e, and the Appointment screen of FIG. 3D may include the prompt "Location:" allowing entry of text describing the location of the Appointment. The user may then enter text such as "Right Here at 6:00 am" using keypad 105a, touch sensitive display 105e, dial 105c, and/or joystick 105d, and the final text can be accepted using the "Select" item. On accepting the subject text, the Icon screen of FIG. 3E may be provided on display 105e.

Figure 3D:
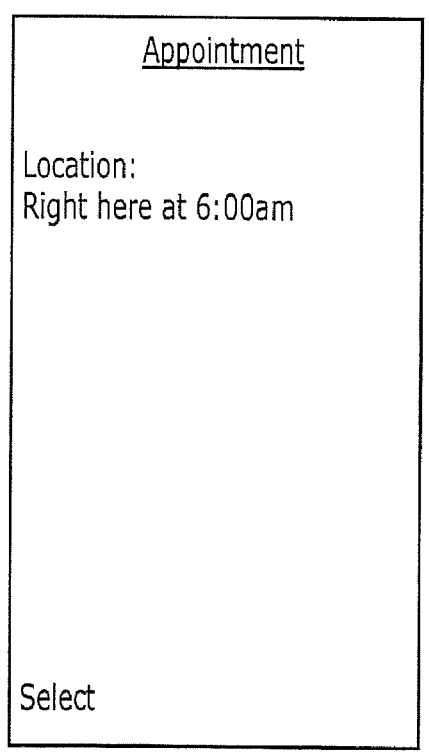

Entry of the subject and location in the screens of FIGS. 3C and 3D may be optional, and the screens of FIGS. 3C and 3D may even be optional. Moreover, other screens prompting for text entry may be included. For example, a "Notes" screen may be added. In another alternative, multiple prompts may be provided on a single screen. For example, a single screen may include prompts for subject, location, and/or notes.

The Icon screen of FIG. 3E may include a menu of appointment types such as "Meeting", "Date", "Travel", "Vacation", "Anniversary", "Miscellaneous", and/or "Media". With a touch sensitive display, the desired menu item may be selected by touching the respective menu item, and then touching the select option. In an alternative, merely touching the menu item may result in selection without requiring touching a separate select option. In addition or in an alternative, selection may be performed using the keypad 105a, dial 105c, and/or joystick 105d. Moreover, the menu may be provided using text, graphic icons, a pull down menu, and/or combinations thereof. The selected appointment type may be provided in the final appointment as additional information, the selected appointment type may initiate prompts for further information, and/or the selected appointment type may affect implementation of the appointment. For example, selection of the "Anniversary" appointment type may provide that the appointment is triggered on the designated date in a plurality of future years.

On selection of the "Media" appointment type, the Start Date/Time screen of FIG. 3F may be provided on display 105e followed by the Network Address screen of FIG. 3G. Selection of other appointment types may result in omission of the Network Address screen. As shown in FIG. 3F, the Start Date/Time screen may include the prompt "Date:" and the prompt "Time:", and the user may enter the date (such as "Apr. 26, 2004") and the time (such as "06:00 AM") for the media appointment. The user may enter the date and time as text using keypad 105a, touch sensitive display 105e, dial 105c, and/or joystick 105d, and the final text can be accepted using the "Select" option. On accepting the subject text, the Network Address screen of FIG. 3G may be provided on display 105e, and the Network Address screen of FIG. 3G may include the prompt "URL:" requesting entry of a URL address for a streaming server from which media streaming content is desired. The user may then enter a URL address such as "rtsp://255.255.255.255". In an alternative, a URL address may be selected from a filtered list of browser bookmarks including streaming media protocols (i.e. rtsp://, etc.). In other words, a complete listing of bookmarks from an internet browser of the radio communications device may be filtered to provide a filtered list of browser bookmarks for streaming servers.

The appointment based on all information provided in screens of FIGS. 3A-G may be saved using the "Save" option of FIG. 3G. Moreover, prompts of FIGS. 3F and 3G may be combined in a single screen, and/or date and time prompts of FIG. 3F may be provided on separate screens.

In another alternative, a "Frequency" option may be provided when adding an appointment using the calendar function. For example, a separate screen may be included with menu items providing selection of different frequencies of occurrence for the appointment, such as one time only, daily, weekly, monthly, and/or yearly. Accordingly, the calendar function may provide that a recurring media streaming appointment can be programmed as a single appointment at a desired frequency of recurrence.

By sequencing through the screens of FIGS. 3A-G, a media appointment for the radio communications device 100 may be entered in a calendar thereof. Accordingly, the controller 107 may initiate media streaming from the streaming server identified by the URL address entered in the screen of FIG. 3G on the date and at the time entered in the screen of FIG. 3F. The type of media may be defined according to the streaming server identified by the URL address entered in the screen of FIG. 3G. For example, the streaming server may provide content such as a live television and/or radio broadcast, previously recorded video and/or audio, animation, live video, etc.

At the time and date entered in the screen of FIG. 3F, the controller 107 may transmit a streaming request to the designated streaming server without user intervention so that the media is provided automatically at the appointed time. More particularly, a data session may be established using any one of a plurality of wireless data protocols such as Circuit Switched Data (CSD), General Packet Radio Service (GPRS), Enhanced Data for GSM Evolution (EDGE), etc. In an alternative, the controller 107 may first provide notification of the scheduled media streaming at the time and date (or shortly before) entered in the screen of FIG. 3F. The user may then allow media streaming by responding to the notification, and upon user allowance, the controller 107 may transmit a streaming request to the streaming server. In the absence of a response from the user and/or if the user declines, the controller 107 may not transmit the streaming request. Streaming audio content may then be routed to a loud speaker of the device. For example, speaker 105f may act as a loudspeaker or a separate loudspeaker may be provided.

Once a media streaming appointment has been added to the calendar, the media streaming appointment can be viewed using the by viewing calendar displays including the day on which the media appointment is scheduled. The media streaming appointment may be displayed on a day view of the day the media appointment is scheduled, on a week view of a week including the day the media appointment is scheduled, and/or on a month view of a month including the day the media appointment is scheduled. When viewing the media appointment, aspects of the media appointment may be edited and/or deleted.

Examples of screens used to implement an alarm function according to embodiments of the present invention are illustrated in FIGS. 4A-D. The screens of FIGS. 4A-D may be generated by the controller 107 and provided on display 105e. While particular text formats are illustrated in FIGS. 4A-D, different formats may be provided. In alternatives, information of FIG. 4A-D may be provided in a graphic format as opposed to text, or the information may be provided in a combined text and graphic format. For example, information of FIGS. 4A-D may be provided using icons, drop down menus, and/or text.

The radio communications device 100 may provide a plurality of functionalities as discussed above. For example, an opening screen may be provided on display 105e when the device 100 is turned on, and the opening screen may provide access to a plurality of different functionalities such as radio-telephone functionality, personal organizer functionality, and/or gaming functionality. For example, access to these functionalities may be provided by touching a respective icon on touch sensitive display 105e. In an alternative, an arrow key of keypad 105a, joystick 105d, and/or dial 105c may allow scrolling through and selection of device functionalities.

Figure 4A:
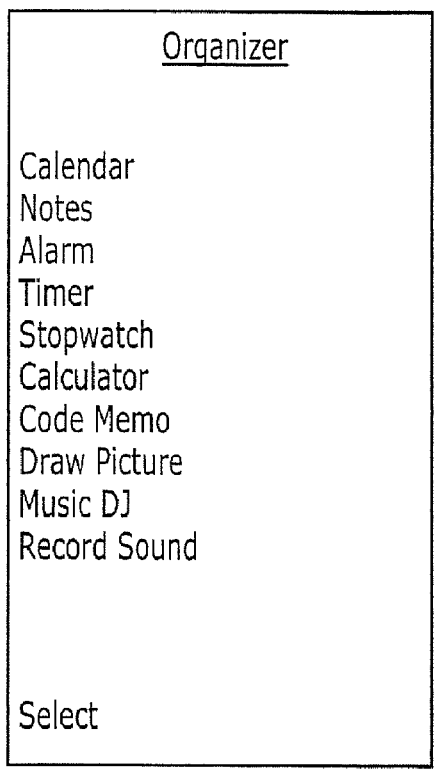
FIGS. 4A-D are displays of alarm functions according to certain embodiments of the present invention.

On selecting the organizer functionality, the screen of FIG. 4A may be provided on display 105e (with the screen of FIG. 4A being the same as the screen of FIG. 3A). The screen of FIG. 4A may include a menu of personal organizer functions such as a "Calendar" function, a "Notes" function, an "Alarm" function, a "Timer" function, a "Stopwatch" function, a "Code memo" function, a "Draw Picture" function, a "Music DJ" function, and/or a "Record Sound" function as discussed above with respect to FIG. 3A. With a touch sensitive display, the desired menu item may be selected by touching the respective menu item, and then touching the select option. In an alternative, merely touching the menu item may result in selection without requiring touching a separate select option. In addition or in an alternative, selection may be performed using the keypad 105a, dial 105c, and/or joystick 105d. Moreover, the menu may be provided using text, graphic icons, a pull down menu, and/or combinations thereof. Any of the personal organizer menu items may be selected to proceed with the respective function, and subsequent screens may provide selection of the respective menu items. Moreover, fewer or more menu items may be provided on the screen of FIG. 4A.

Figure 4B:
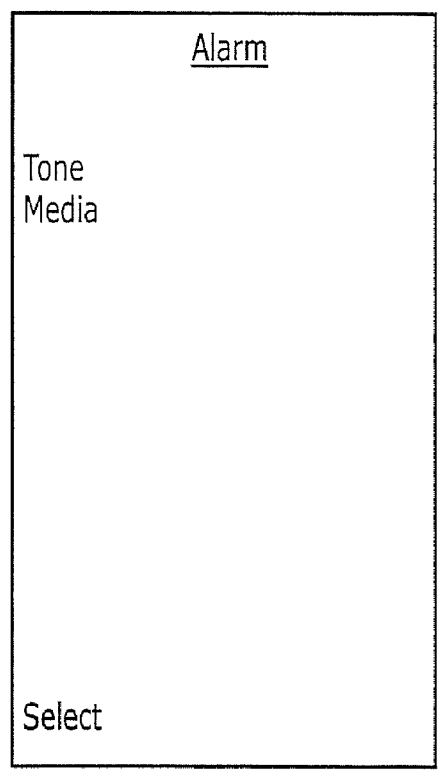

On selecting the "Alarm" function, the screen of FIG. 4B may be provided on display 105e, and the screen of FIG. 4B may include a menu of alarm functions such as a "Tone" function, and a "Media" function. With a touch sensitive display, the desired menu item may be selected by touching the respective menu item, and then touching the select option. In an alternative, merely touching the menu item may result in selection without requiring touching a separate select option. In addition or in an alternative, selection may be performed using the keypad 105a, dial 105c, and/or joystick 105d. Moreover, the menu may be provided using text, graphic icons, a pull down menu, and/or combinations thereof. Any of the calendar menu items may be selected to proceed with the respective function, and subsequent screens may provide selection of the respective menu items. For example, the "Tone" item may be selected to provide an alarm tone, and a subsequent screen may allow further choices regarding different tones that may be available. The "Media" item may be selected to provide that the alarm will provide streaming media at a designated time. Moreover, fewer or more menu items may be provided on the screen of FIG. 4B.

Figure 4C:
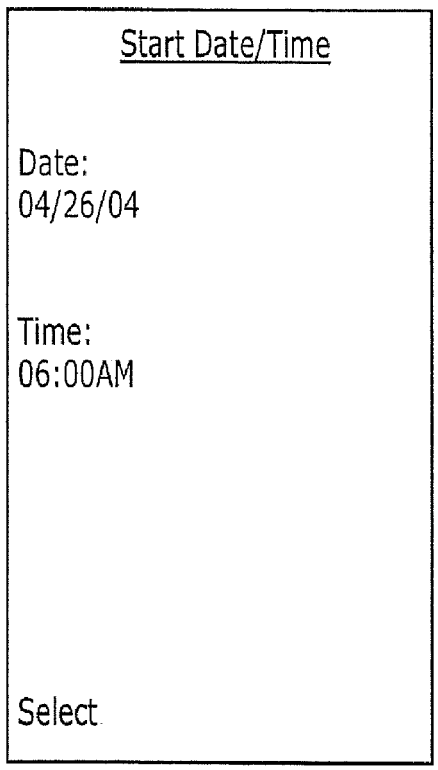
Figure 4D:
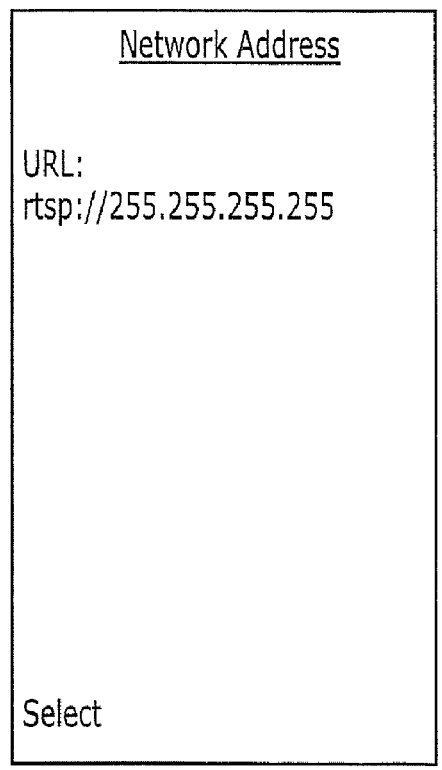

On selecting the "Media" item, the Start Date/Time screen of FIG. 4C may be provided on display 105e followed by the Network Address screen of FIG. 4D. Selection of other appointment types may result in omission of the Network Address screen. As shown in FIG. 4C, the Start Date/Time screen may include the "Date:" prompt and the "Time:" prompt, and the user may enter the date (such as "Apr. 26, 2004") and the time (such as "06:00 AM") for the media alarm. The user may then enter the date and time as text using keypad 105a, touch sensitive display 105e, dial 105c, and/or joystick 105d, and the final text can be accepted using the "Select" item. On accepting the date and time, the Network Address screen of FIG. 4D may be provided on display 105e, and the Network Address screen of FIG. 4D may include the prompt "URL:" requesting entry of a URL address for a streaming server from which media streaming content is desired. The user may then enter a URL address such as "rtsp://255.255.255.255". In an alternative, a URL address may be selected from a filtered list of browser bookmarks including streaming media protocols (i.e. rtsp://, etc.).

The alarm based on all information provided in screens of FIGS. 4A-D may be saved using the "Save" item of FIG. 4D. Moreover, prompts of FIGS. 4C and 4D may be combined in a single screen, and/or date and time prompts of FIG. 4C may be provided on separate screens.

By sequencing through the screens of FIGS. 4A-D, a media alarm may be provided by the radio communications device 100. Accordingly, the controller 107 may initiate media streaming from the streaming server identified by the URL address entered in the screen of FIG. 4D on the date and at the time entered in the screen of FIG. 4C. The type of media may be defined by the streaming server identified by the URL address entered in the screen of FIG. 4D. For example, the streaming server may provide content such as a live television and/or radio broadcast, previously recorded video and/or audio, animation, live video, etc.

At the time and date entered in the screen of FIG. 4C, the controller 107 may transmit a streaming request to the designated streaming server without user intervention so that the media is provided automatically at the alarm time. For example, the radio communications device 100 may be set to automatically play media from a streaming server at a predetermined time. More particularly, a data session may be established using any one of a plurality of wireless data protocols such as Circuit Switched Data (CSD), General Packet Radio Service (GPRS), Enhanced Data for GSM Evolution (EDGE), etc. Streaming audio content may then be routed to a loud speaker of the device. For example, speaker 105f may act as a loudspeaker or a separate loudspeaker may be provided. If the streaming server provides a live radio broadcast, the device 100 may provide fuctionality equivalent to that of a alarm clock radio.

As shown in FIG. 4B, a user may choose between a tone alarm stored in the phone (by selecting the tone item) or a media alarm (by selecting the media item). If a media alarm is selected, a time and source for the media alarm may be selected as discussed above with regard to FIGS. 4C and 4D. If a tone alarm is selected, a time and a tone type may be selected using additional menus. For example, one of a plurality of tones stored in the device (such as a buzzer, a beep, a chime, a segment of music, etc.) may be selected and/or one of a plurality of tones may be downloaded to and stored in the device. For example, a tone alarm may be downloaded and/or stored in the device according to any one of a plurality of electronic file types such as Audio/Modem Riser (AMR), Musical Instrument Digital Interface (MIDI), Moving Pictures Experts Group-1 Layer 3 (MP3), etc.

Stated in other words, a tone alarm may be selected to provide relatively static content for the alarm, and the static content for the tone alarm may be stored on the phone. In contrast, a media alarm may provide dynamic content that is streamed from a streaming server identified by an address for the streaming server. If a media alarm is selected and the device is unable to obtain content from the designated streaming server (such as when internet access is unavailable or the streaming server is not functioning), the alarm may be undesirably silent. Accordingly, if a media alarm has been selected, but no sound is generated by the device when access to the streaming server is attempted at the alarm time, the device may default to a stored tone alarm. A user of the device may thus be alerted to the alarm even if the streaming server is off-line, if the device is unable to access the internet, and/or if content from the streaming server is otherwise unavailable. In the event that a radio link cannot be established, an internet connection cannot be established, the streaming server is unavailable, no content is received from the streaming server, and/or no sound is generated when the device attempts to stream content from a designated streaming server during a media alarm, the device may default to a tone alarm such as a beeper, a buzzer, a chime, a segment of music, or other sound stored in non-volatile memory of the device. A default tone alarm, for example, may be selected using another menu in addition to those illustrated in FIGS. 4A-D. A back-up sound may thus be provided in the event that media streaming does not produce audible sound at the alarm time.

As discussed above, the organizer screen of FIGS. 3A and 4A provides a plurality of menu options for different functionalities. Calendar functions are discussed above with respect to FIGS. 3A-G, and alarm functions are discussed above with respect to FIGS. 4A-D. Selection of any of the other device functionality may initiate respective screens and/or operations of the selected function. For example, an address book function may be selected to display at least one name for which address information is available, to edit an address record, to create a new address record, and/or to obtain other address information, and/or to initiate a phone call to a number included in the address book.

In the drawings and specification, there have been disclosed typical preferred embodiments of the invention and, although specific terms are employed, they are used in a generic and descriptive sense only and not for purposes of limitation, the scope of the invention being set forth in the following claims. As used herein, the term "comprising" or "comprises" is open-ended, and includes one or more stated elements, steps, and/or functions. More particularly, it should be emphasized that the term "comprises/comprising" when used in this specification is taken to specify the presence of stated features, integers, steps or components but does not preclude the presence or addition of one or more other features, integers, steps, components or groups thereof.

That which is claimed:

1. A radio communications device comprising:
a transceiver configured to transmit and receive radio communications;
a user interface configured to accept user input and provide user output; and
a controller coupled to the transceiver and the user interface, the controller being configured to accept a streaming time to initiate media streaming in the future wherein the streaming time is accepted as user input through the user interface, to accept user input of a network address of a streaming server to provide media streaming content wherein the network address is accepted as user input through the user interface, and to initiate media streaming from the streaming server identified by the network address at the streaming time over a radio link so that the media streaming is received at the radio communications device through the transceiver;
wherein the controller is further configured to determine if sound is being generated at a speaker of the radio communications device responsive to the media streaming after initiating media streaming, and to default to generating a backup tone at the speaker if sound is not being generated at the speaker responsive to the media streaming.

2. A radio communications device according to claim 1 wherein the controller is further configured to accept selection of a calendar function from a plurality of personal organizer functions before accepting the streaming time and before accepting the network address wherein selection of the calendar function is accepted as user input through the user interface, to accept a streaming date to initiate media streaming after selection of the calendar function wherein the streaming date is accepted as user input through the user interface, to accept the streaming time after accepting selection of the calendar function, and to initiate media streaming on the streaming date at the streaming time.

3. A radio communications device according to claim 1 wherein the controller is further configured to provide a menu of a plurality of personal organizer functions including a calendar function before accepting the streaming time and before accepting the network address, to accept selection of the calendar function from the plurality of personal organizer functions after providing the menu of the plurality of organizer functions, to provide a menu of a plurality of calendar functions including an appointment function responsive to accepting user input selecting the calendar function, to accept selection of the appointment function after providing the menu of the plurality of calendar functions, and to accept a streaming date to initiate media streaming after accepting selection of the appointment function, wherein the streaming time is accepted after selection of the calendar function, and wherein media streaming is initiated on the streaming date at the streaming time.

4. A radio communications device according to claim 1 wherein the controller is further configured to accept selection of an alarm function from a plurality of personal organizer functions before accepting the streaming time and before accepting the network address, to accept the streaming time after selection of the alarm function.

5. A radio communications device according to claim 4 wherein the controller is further configured to provide an alarm at the streaming time, to accept user allowance to initiate media streaming, and to transmit a streaming request to the streaming server identified by the network address responsive to accepting user allowance to initiate media streaming wherein the streaming request is transmitted through the transceiver over a radio link.

6. A radio communications device according to claim 4 wherein the controller is further configured to transmit a streaming request through the transceiver to the streaming server identified by the network address at the streaming time without user intervention.

7. A radio communications device comprising:
a transceiver configured to transmit and receive radio communications;
a user interface configured to accept user input and provide user output; and
a controller coupled to the transceiver and the user interface, the controller being configured to accept a streaming time to initiate media streaming in the future wherein the streaming time is accepted as user input through the user interface, to accept user input of a network address of a streaming server to provide media streaming content wherein the network address is accepted as user input through the user interface, and to initiate media streaming from the streaming server identified by the network address at the streaming time over a radio link so that the media streaming is received at the radio communications device through the transceiver;

wherein the controller is further configured to provide notification of scheduled media streaming through the user interface, to withhold transmission of a streaming request in the absence of user input to allow initiating media streaming after providing notification of scheduled media streaming, to accept user input through the user interface at the radio communications device to allow initiating media streaming though the user interface after providing notification of scheduled media streaming, and to transmit a streaming request through the transceiver to the streaming server identified by the network address responsive to accepting user input to allow initiating media streaming.

8. A radio communications device according to claim 1 wherein the controller is further configured to transmit a streaming request to the streaming server identified by the network address at the streaming time without user intervention.

9. A radio communications device according to claim 1 wherein the radio communications device is turned off between accepting the network address of the streaming server and the streaming time, wherein the controller is further configured to turn the radio communications device on at the streaming time without user intervention.

10. A radio communications device according to claim 1 the controller is further configured to transmit a streaming request through the transceiver to the streaming server identified by the network address, and to receive media streaming content from the streaming server identified by the streaming request after transmitting the streaming request.

11. A radio communications device according to claim 10 wherein the controller is configured to transmit the streaming request through the transceiver according to a Real-Time Streaming Protocol (RTSP), and to receive the media streaming content through the transceiver according to a Real-time Transport Protocol (RTP).

12. A radio communications device according to claim 10 wherein the controller is further configured to process the media streaming content and to provide the processed media streaming content as output through the user interface.

13. A radio communications device according to claim 12 wherein the controller is configured to process the media stream using a media player.

14. A radio communications device according to claim 1 wherein the network address comprises a Uniform Resource Locator (URL) address.

15. A radio communications device according to claim 14 further comprising:
an internet browser, wherein accepting user input of the network address comprises accepting user selection of the network address from a list of browser bookmarks from the browser.

16. A radio communications device according to claim 15 wherein the list of browser bookmarks comprises a filtered list of browser bookmarks for streaming servers.

17. A radio communications device according to claim 1 wherein the controller is further configured to establish a radiotelephone communication with another communications device through the transceiver.

18. A radio communications device comprising:
a transceiver configured to transmit and receive radio communications;
a user interface configured to accept user input and provide user output; and
a controller coupled to the transceiver and the user interface, the controller being configured to accept a streaming time to initiate media streaming in the future wherein the streaming time is accepted as user input through the user interface, to accept user input of a network address of a streaming server to provide media streaming content wherein the network address is accepted as user input through the user interface, and to initiate media streaming from the streaming server identified by the network address at the streaming time over a radio link so that the media streaming is received at the radio communications device through the transceiver;
wherein the controller is further configured to determine if media streaming content is being received from the streaming server after initiating media streaming, and to default to generating a backup tone at the speaker if media streaming content is not being received responsive to initiating media streaming.

19. A radio communications device according to claim 1 further comprising:
a speaker coupled to the controller wherein the controller is further configured to broadcast audio content through the speaker responsive to the media steaming.

* * * * *